United States Patent

[11] 3,620,476

[72] Inventor Felipe Cervantes
La Crescenta, Calif.

[21] Appl. No. 815,584
[22] Filed Apr. 14, 1969
[45] Patented Nov. 16, 1971
[73] Assignee Infonics, Inc.
Santa Monica, Calif.

[54] CASSETTE DUPLICATOR
12 Claims, 7 Drawing Figs.

[52] U.S. Cl. 242/197, 179/100.2 E, 274/4 G
[51] Int. Cl. G03b 1/04, G11b 15/32, G11b 23/04
[50] Field of Search 242/188–208; 274/4, 11; 179/100.2 E, 100.2 Z

[56] References Cited

UNITED STATES PATENTS

| | | | |
|---|---|---|---|
| 3,072,753 | 1/1963 | Goldberg | 179/100.2 |
| 3,177,299 | 4/1965 | Smith | 179/100.2 |
| 2,560,234 | 7/1951 | Masterson | 179/100.2 |
| 2,909,337 | 10/1959 | Lahti et al. | 242/208 |
| 3,001,733 | 9/1961 | Axon et al. | 242/208 |
| 3,158,374 | 11/1964 | Nickl | 242/197 |
| 3,167,264 | 1/1965 | Ohtsu | 242/201 |

*Primary Examiner*—Leonard D. Christian
*Attorney*—Christie, Parker & Hale

ABSTRACT: A high-speed inexpensive magnetic tape duplicator is provided which is capable, for example, of duplicating a program recorded on a master magnetic tape simultaneously on a plurality of cassette-type magnetic tape cartridges preloaded with magnetic tape, and the like. The apparatus of the invention is controlled so that all tapes quickly come up to speed in order that maximum use may be made of all the tapes in the various cassettes. This minimizes the beginning portion of poor recording quality on the tape, and short leaders may be used.

INVENTOR
Felipe Cervantes
Jessup and Beecher
By Warren T. Jessup
ATTORNEYS

INVENTOR:
Felipe Cervantes
Jessup and Beecher
By Warren T. Jessup
ATTORNEYS

INVENTOR:
Felipe Cervantes
Jessup and Beecher
By Warren T. Jessup
ATTORNEYS

INVENTOR
Felipe Cervantes
Jessup and Beecher
By Warren T. Jessup
ATTORNEYS

CASSETTE DUPLICATOR

BACKGROUND OF THE INVENTION

A large market has recently developed for small magnetic tape cartridges which are usually referred to as "cassettes." The recorded information on the cassettes may be reproduced with high quality in relatively inexpensive reproducing equipment. The recorded information, for example, may be music, educational material, religious messages, or a variety of other data and information.

The need has arisen for simple and inexpensive duplicating apparatus, by which material is recorded, for example, on a master tape may be duplicated with high quality on a multiplicity of cassette tapes for general distribution. It is essential, of course, in such equipment that the duplicating process proceed rapidly and efficiently, so that a large number of cassettes may be processed in a relatively short time, and so that there will be a minimum of unused tape in the individual cassettes at the beginning when the duplicating process is completed.

The duplicating apparatus of the present invention is constructed to fulfill all the criteria set forth in the preceding paragraph. Specifically, the duplicating apparatus to be described is simple and inexpensive in its construction, and yet it is capable of simultaneously duplicating recorded information from a master tape on a plurality of individual cassettes. The apparatus of the invention has the feature in that it may rapidly be brought up to recording speed so that there is a minimum of unused tape at the beginning in the individual cassettes.

DETAILED DESCRIPTION OF THE ILLUSTRATED EMBODIMENT

Figures 1, 3:
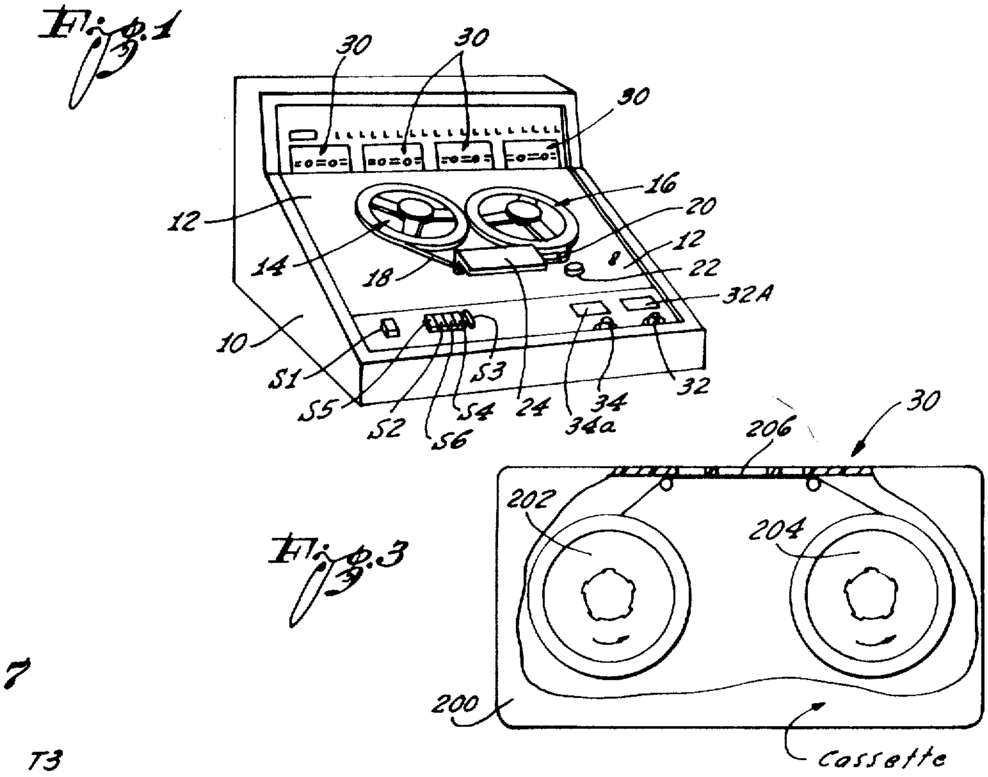
FIG. 1 is a perspective view of a unit which may be constructed to incorporate the concepts of the present invention.
FIG. 3 is a typical cassette-type removable tape cartridge on which information may be duplicated in the apparatus of the invention.

The equipment shown in FIG. 1 includes a casing 10 which supports a panel 12 in an inclined position. A master tape transport is supported on the panel 12, and this transport includes, for example, a supply reel 14 and a takeup reel 16. The master magnetic tape 18 is wound on the supply reel 14, and is drawn by a capstan 20 in conjunction with a movable puck 22 past a series of electromagnetic reproduce heads 24.

A series of control push button switches are also supported on the inclined panel 12 of the housing 10, and these pushbutton switches include an "on-off" switch S1, a "stop" switch S2, a "record" switch S3, a "play" switch S4, a "rewind" switch S5, and a "fast forward" switch S6.

In a manner to be described, the information recorded on the master tape 18 is duplicated on the magnetic tapes associated with each of four cassettes designated 30. The cassettes 30, as shown in FIG. 1, are supported in an upright position to the rear of the panel 12 on the duplicator equipment housing 10. Appropriate gain, or volume, controls 32 and 34 are also included on the inclined panel 12.

In order to duplicate the information recorded on the master tape 18, the four cassettes 30 are inserted into position. on the housing 10 of the duplicating apparatus, as shown in FIG. 1, and the volume controls 32 and 34 are set, for example, to a midscale reading on their associated meters 32*a* and 34*a*. Then, by pressing the record and play pushbuttons S3 and S4 at the same time, the master tape 18 and all four cassettes 30 are put into high speed motion, almost instantaneously.

During a normal duplicating operation by a constructed embodiment of the invention, the master tape is normally driven at 30 i.p.s. and the cassettes at 15 i.p.s. For a typical 1-hour cassette, for example, the entire duplicating process by the constructed embodiment of the invention, in which all tracks are duplicated simultaneously, requires only 4 minutes. Since a 1 hour cassette requires that the tape be driven in both directions to complete the playback of all tracks, the recording of all tracks simultaneously takes place with the tape traveling at least eight times the normal cassette tape speed. The master tape transport senses the end of the master tape 18 and shut the entire instrument off automatically.

It has been found, for example, inexpedient in the case of the master tape transport to bring the capstan 20 up to full speed prior to its engagement of the tape 18 where speeds of 30 i.p.s. are involved. This is due to the difficulty of providing an adequate control for the takeup reel 16, since that reel must immediately come up to an appropriate speed, or else the tape will "spill." On the other hand, if the takeup reel 16 comes up to speed too quickly under these conditions, the excessive strain on the tape will create breakage. The aforesaid problem is aggravated due to the fact that the capstan 20 should be driven at an invariable speed during normal operation for high-quality duplication, and unless excessively expensive servomechanisms are to be used, this requires a high-inertia-hysteresis-type motor, for example.

For the above reason, it is usual in the prior art to require up to 10 seconds before the master tape can be brought up to the operating speed of 30 ips. This is because the prior art practice has been to cause the capstan to the tape (by causing the puck to squeeze the tape against the capstan) prior to starting up the capstan motor, and then bringing the motor up to speed. In order to avoid complicated control systems, the drive for the cassettes should be linked with the drive for the master tape, so that in most duplicating equipment the cassette tapes also move during the interval in which the master tape is coming up to speed, and the aforesaid 10-second time delay of the prior art duplicators results in wastages of up to 150 inches of tape in each cassette.

In the system of the present invention, the low-cost high-inertia hysteresis motor is used to drive the capstan 20. However, the time required for the tape to come up to full speed is reduced from 10 seconds to the order of 2 seconds, or less, in the apparatus and system to be described. This time reduction is achieved by causing the capstan 20 to rotate freely, for example, at a rate corresponding to 15 i.p.s. or 900 r.p.m. in the constructed embodiment, as soon as the on-off switch S1 is turned on, and before the puck 22 is actuated to squeeze the tape against the capstan. Then, when the record and play switches S3 and S4 are depressed, the puck is activated and caused to squeeze the tape 18 against the already rotating capstan so that the capstan drives the tape immediately. It has been found that the takeup reel 16 can be adequately controlled at the lower speed so as to take up the slack in the tape to avoid tape spillage, and at the same time without any tendency to create excessive forces on the tape.

Immediately when the puck 22 is moved toward the rotating capstan 20 to squeeze the tape 18 against the capstan in the equipment of the invention, an internal relay in the equipment switches the hysteresis motor so as to increase its speed, for example, from the 900 r.p.m. to 1,800 r.p.m. The latter speed of 1,800 r.p.m. corresponds, for example, to 30 inches per second of drive of the tape 18 in the master tape transport. It has been found that the master tape 18 can be brought up to operating speed by this expedient in less than 2 seconds, as compared with the 10-second lag required in the prior art apparatus.

Figure 2:
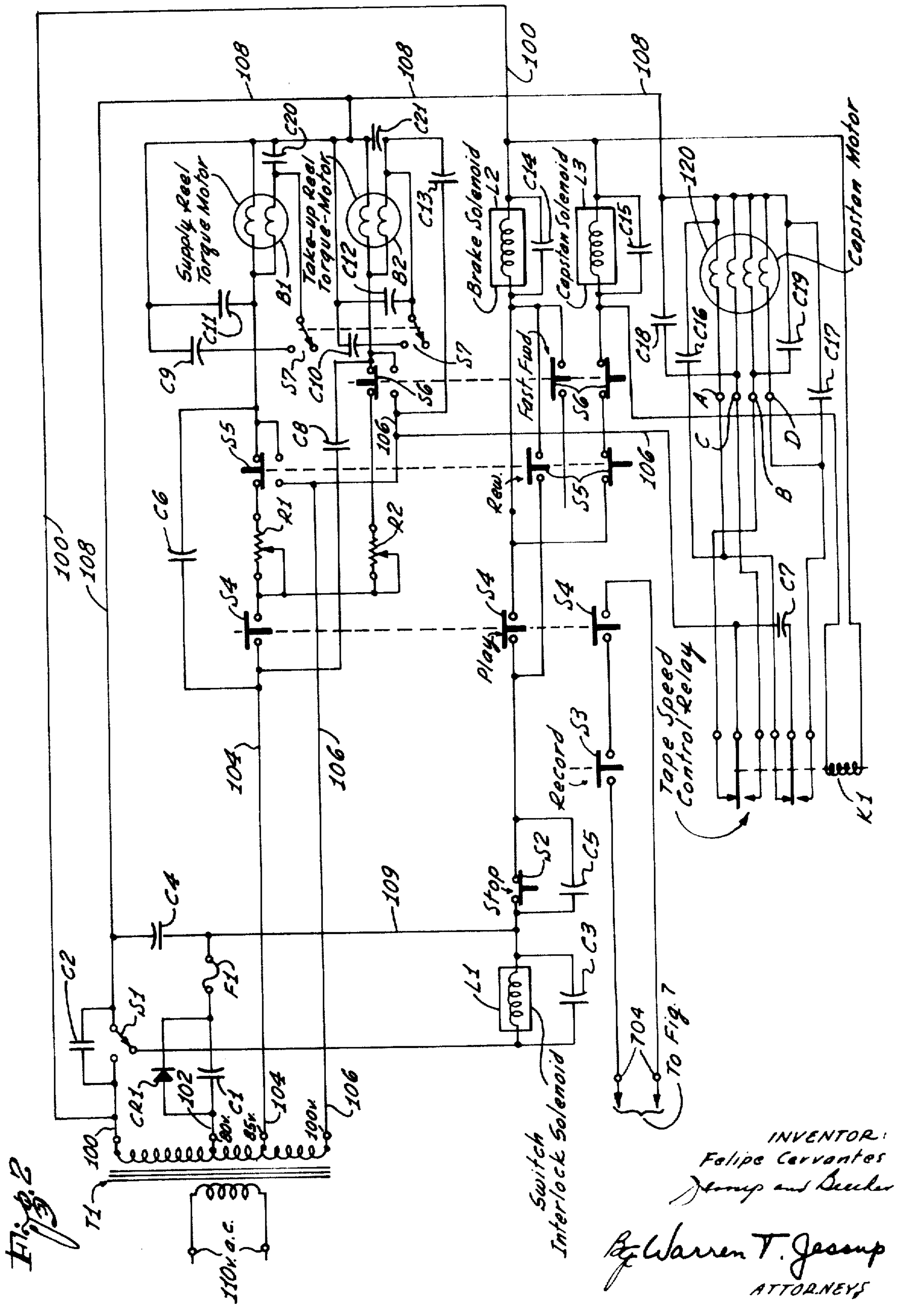
FIG. 2 is a circuit diagram of the control system used in conjunction with the master tape transport in the apparatus of the invention.

The control circuit shown in FIG. 2 accomplishes the aforesaid control on the capstan motor. The circuit diagram of FIG. 2 includes a transformer T1 which may be used to transform the usual 110-volt AC current into various alternating current voltages. For example, the lead 100 may be considered a common lead, whereas the lead 102 may be an 80-volt lead, the lead 104 may be an 85-volt lead, and the lead 106 may be a 100-volt lead. The on-off switch S1 referred to above is connected between a further lead 108 and the common lead 100.

The switch S1 is a single-pole, double-throw switch, and it is shunted by a 0.1-microfarad capacitor C2, as shown. The movable contact of the switch S1 is connected to the lead 108, and one of its fixed contacts is connected to the lead 100, whereas the other is connected to one side of a switch interlock solenoid L1, the other side of the solenoid being connected to the 80-volt lead 109. The solenoid is shunted by a 0.1-microfarad capacitor C3, whereas a 100-microfarad capacitor C4 is connected between the leads 100 and 102; and a 0.1-microfarad capacitor C1, shunted by a diode CR1 is included in the lead 102, so as to provide half-wave rectification for the voltage on the 80-volt lead 102.

The lead 109 is connected through the normally closed "-stop" pushbutton switch S2, and through the normally open "-play" pushbutton switch S4 to one side of a brake solenoid L2, the other side of which is connected to the common lead 100. The brake solenoid L2 is associated with both the supply reel 14 and the takeup reel 16 of the master tape transport of FIG. 1. The brake solenoid L2 must be energized in order to permit the reels 14 and 16 to rotate. When the solenoid is deenergized, the reels are immediately braked to a stop. The stop switch S2 is shunted by a 0.1-microfarad capacitor C5, whereas the brake solenoid is shunted by a 0.1-microfarad capacitor C14.

The stop switch 32 is also connected through the normally open rewind pushbutton switch S5 to the brake solenoid L2; and the play switch S4 is connected through normally closed contacts of the rewind switch S5 and normally closed contacts of the fast forward switch S6 to one side of the capstan solenoid L3. The capstan solenoid L3, like the brake solenoid L2, is connected to the common lead 100. The capstan solenoid L3 is shunted by a capacitor C15 which may have a capacity of 0.1 microfarad. When the capstan solenoid is energized, the puck 22 of FIG. 1 is moved towards the capstan 20, so as to squeeze the tape 18 against the capstan to permit the capstan to drive the tape.

The fast forward switch S6 also has a pair of normally open contacts which are connected between the normally closed stop switch contact S2 and the brake solenoid L2. The record switch S3 actuates a pair of normally open contacts which are in series with a further pair of normally open contacts associated with the play switch S4. When both the play switch and the record switch are closed, the duplicating equipment is activated as will be described.

The coil of a relay K1 is also connected across the capstan solenoid L3, so that when the capstan solenoid is energized, the relay K1 is also energized. The relay K1 has two pairs of normally closed contacts which are connected respectively to terminals A and B of a motor 120. The motor 120 drives the capstan 20 of FIG. 1. The windings of the motor 120 are connected to the lead 108. THe relay K1 also has two pairs of normally open contacts which are connected respectively to terminals C and D of the motor 120. The terminals A, B, C and D of the motor 120 are connected to corresponding 0.1-microfarad capacitors C16, C17, C18 and C19 which, in turn, are connected to the lead 108. One of the movable contacts of the relay K1 is connected to the 100-volt lead 106, and the other movable contact is coupled to the lead 106 through a 2.8 microfarad capacitor C7.

The 85-volt lead 104 is connected through a pair of normally open contacts of the play switch S4 to a variable resistor R1, the potentiometer having a resistance of 600 ohms. The variable resistor R1 is connected through a pair of normally closed contacts of the rewind switch S5 to the windings of the supply reel motor B1 which, as indicated, may be a torque motor. The first winding of the motor B1 is shunted by a 0.1-microfarad capacitor C11, and that winding is connected to the lead 108. The second winding of the motor B1 is coupled to the lead 108 through a 3 microfarad capacitor C20.

A double-pole, double-throw switch S7 has one movable contact connected to the capacitor C20, and it has a fixed contact coupled through a 1-microfarad capacitor C9 to the common lead 100. As shown, similar connections are associated with the takeup reel torque motor B2, the latter motor having similar capacitors C10, C12, C13 and C21 associated with its windings, and also including the other part of the double-pole switch S7.

The last-mentioned normally open contacts of the "play" switch S4 are connected through a 600-ohm variable resistor R2, and through a pair of normally closed contacts of the "fast forward" switch S6 to the windings of the takeup reel torque motor B2. The 100-volt lead 106 is connected through a pair of normally open contacts of the "rewind" switch S5 to the windings of the supply reel torque motor B1, and through a pair of normally open contacts of the "fast forward" switch S6 to the windings of the takeup reel torque motor B2.

It will be appreciated that the switch S7, when set to its illustrated position causes the capacitor C20 to be included in the circuit of the motor B1, and the capacitor C21 to be included in the circuit of the motor B2, for a particular line frequency of 50 or 60 cycles. However, when the switch S7 is set to its alternate position, the capacitors C9 and C10 are respectively connected in shunt with the capacitors C20 and C21 so that the motors are driven at a lower line frequency.

A capacitor C6 is connected across the variable resistor R1 and across the associated contacts of the switches S4 and S5. Likewise a capacitor C8 is connected across the variable resistor R2 and across the associated contacts of the switches S4 and S6. Both of the capacitors C6 and C8 may have a capacity of 0.1 microfarads.

In the operation of the master tape transport system described above, the switch S1 is moved from its illustrated position to deenergize the switch interlock solenoid L1, so that the various pushbutton in a S2–S7 may be operated, and the switch S1 is moved to a position in which the lead 108 is established as a common power lead. Under these conditions, the capstan motor 120 is energized at its low speed of, for example, 900 r.p.m., since the relay K1 is deenergized.

Then, when the "play" switch S4 is depressed, the brake solenoid L2 and the capstan solenoid L3 are energized. At the same time, the takeup reel motor B2 is energized in a direction so that the master tape 18 from the capstan and puck combination 20–22 of FIG. 1 may be reeled on the takeup reel 16. Also, the supply reel torque motor B1 is energized in the opposite direction, so that it may act as a dynamic brake on the tape. Therefore, when the "play" switch S4 is depressed, the takeup reel 16 beings to turn, and the puck 22 is moved towards the capstan 20.

It will be appreciated that prior to the operations described in the preceding paragraph, the high-inertia hysteresis capstan drive motor 120 is already being driven at 900 r.p.m., and the capstan 20 is already rotating, and the puck 22 squeezes the tape 18 against the rotating capstan 20. The tape is then drawn across the heads 24 by the capstan 20, and is reeled onto the reel 16 against the dynamic braking effect of the reel 14.

Almost instantaneously, the relay K1 is energized, so that the capstan drive motor 120 is energized to its high speed, and the capstan 20 rapidly comes up to the required speed for the 30 i.p.s. movement of the master tape 18. In practice, the "-play" switch S4 and the "record" switch S3 are depressed together, so that the duplicating equipment may be simultaneously energized and information on the master tape may immediately be recorded on the tapes of the four cassettes 30 shown in FIG. 1.

The circuit continues to operate until the stop switch S2 is actuated. This switch may be actuated manually at any time, and it may also be operated automatically when the end-of-program signal on the master tape 18 is detected in the usual detecting circuitry.

When the "rewind" switch S5 is depressed, the capstan solenoid L3 is deenergized, so that the puck 22 moves back from the tape. Also, the brake solenoid L2 associated with the two reels 14 and 16 is energized so that the brake is released. The supply reel motor B1 is now energized at high speed by the upper normally open contacts of the "rewind" switch S5 which close to connect the 100-volt lead 106 to the windings of the supply reel motor. The takeup reel motor B2 is deenergized, and the tape rapidly is rewound on the supply reel.

For fast forward operation the "fast forward" switch S6 is depressed which again releases the capstan solenoid L3 and energizes the brake solenoid L2 to release the brake. The "fast forward" switch S6 connects the 100-volt lead 106 to the takeup reel motor B2 through the normally open upper contacts of the switch S6, at which time the supply reel torque motor B1 is deenergized. Therefore, the takeup reel torque motor B2 is energized at high speed to move the tape rapidly forward from the supply reel onto the takeup reel.

The pushbutton switches S2, S3, S4, S5 and S6 may be mechanically interlocked in accordance with known practice, so that whenever any one of the switches is depressed, the others are all open. The switch interlock solenoid L1, as mentioned above, is energized when the switch S1 is turned to its off position, so as to assure that all the switches S2–S6 will be in their illustrated position when the switch S1 is again closed.

The cassette 30 itself, as shown in FIG. 3, for example, includes a case 200. A supply reel 202 and a takeup reel 204 are rotatably mounted in the case. A tape 206 is intercoupled between the two reels, so that when the takeup reel 204 is turned in a clockwise direction, it moves the tape from the takeup reel 202 and draws the tape across an opening at the edge of the casing 200.

Figures 4, 6:
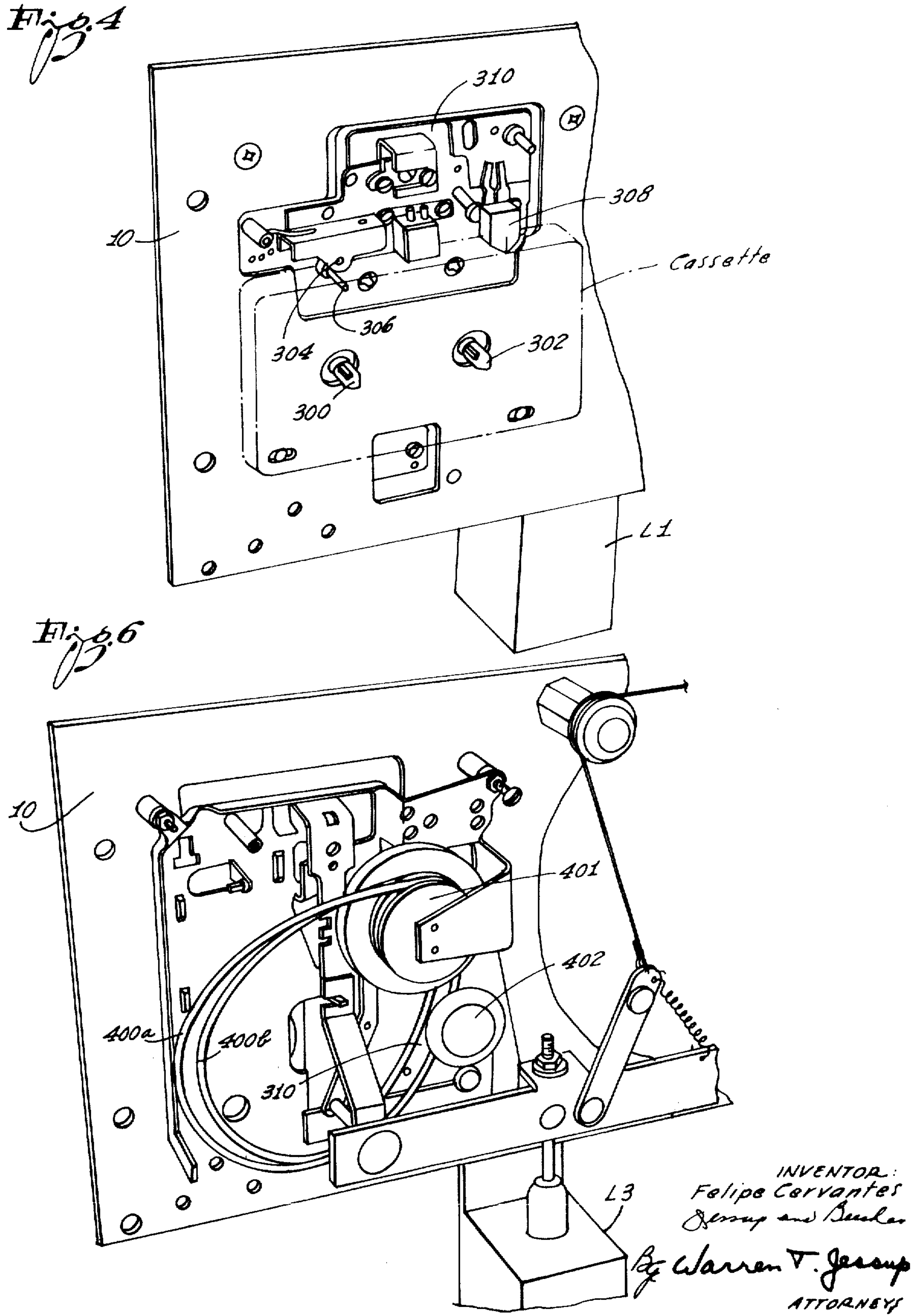
FIGS. 4, 5 and 6 are views of the duplicating apparatus, FIG. 4 being a fragmentary front view of the chassis on which the individual cassettes are supported for duplicating purposes, FIG. 5 being a rear view of the chassis, and FIG. 6 being a fragmentary rear view with various components removed to reveal other operating components thereof.

When the cassette is inserted into the duplicating apparatus, and as shown in FIG. 4, a pair of shafts 300 and 302 extend from the duplicating apparatus into the hubs of the reels 202 and 204. One of the shafts is driven, so that the reel 204 may be rotated. Also, the tape 206 is threaded between a movable puck 304 and capstan 306 on the duplicator which are positioned, so that when a movable chassis 310, in the duplicator is moved from its inactive upper position down to its active "record" position, the puck 304 squeezes the tape against the capstan.

The capstan 306 is driven to draw the tape from the supply reel 202 of the cassette to the takeup reel when the movable chassis 310 is in its active position, and across a magnetic head 308 which is also mounted on the movable chassis of the duplicating apparatus. The program from the master tape may then be recorded on the tape 200 in the cassette 30, after which the cassette 30 may be removed from the duplicator apparatus for distribution to the trade.

Figure 7:
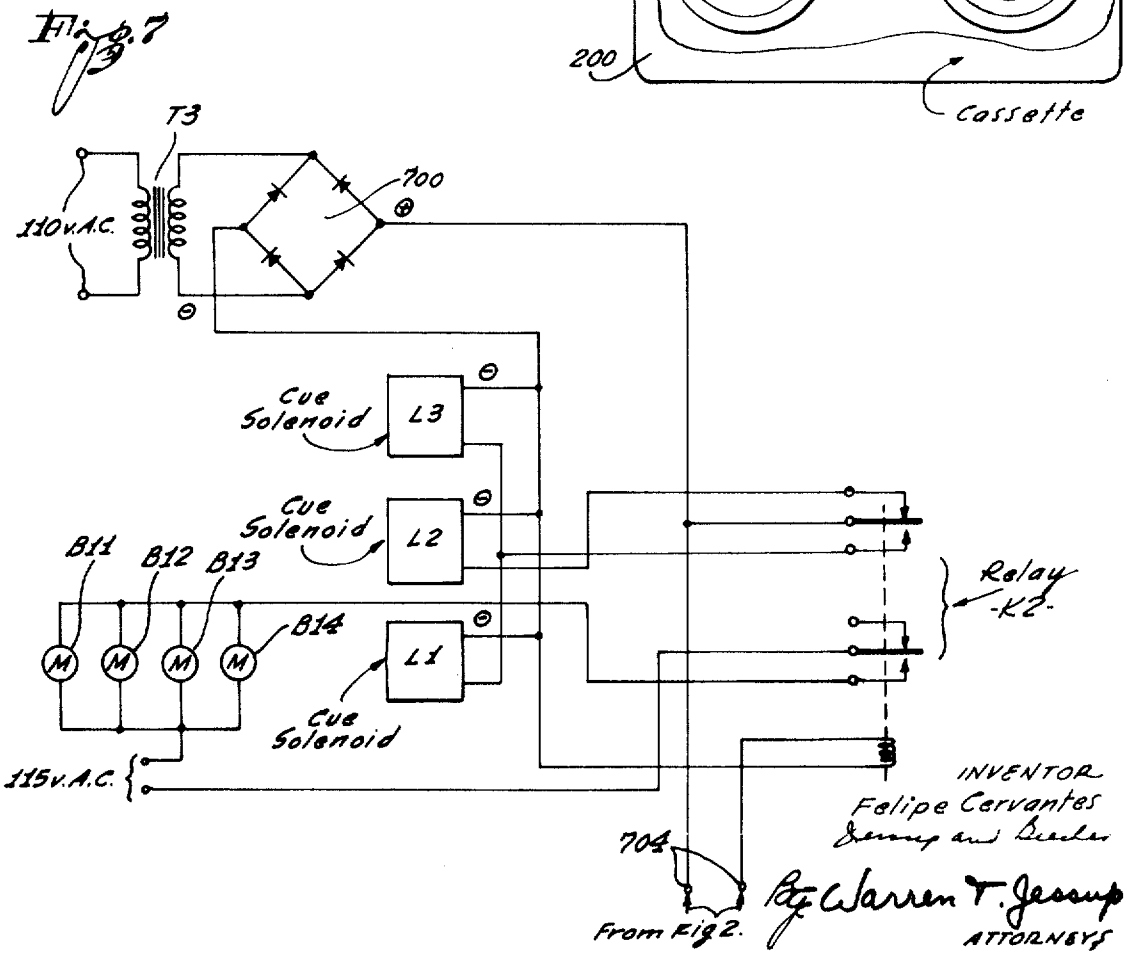
FIG. 7 is a circuit diagram of a control system which is actuated by the master transport control system to operate the duplicator apparatus.

The duplicator control system may be represented by the circuit diagram of FIG. 7. The transformer T3 in FIG. 7 serves to apply the usual 110-volt alternating current mains to a full-wave rectifier 700, and the resulting direct current from the full-wave rectifier is applied controllably to a pair of cue solenoids L1 and L3, and to a return solenoid L2. The cue solenoids L2 and L3, when energized, serve to move the movable chassis 310 down into its active position to move the puck 304 and head 308 into operative positions, so that the tape 200 in the cassette 30 may be driven and recordings made as described above. Simultaneously, identical equipment is actuated by the movement of the movable chassis 310 for each of the three additional cassettes 30 shown in FIG. 1. When the return relay L2 is energized the movable chassis 310 is returned to its upper inactive position.

The circuit of FIG. 7 includes a relay K4 which is controlled by the master control circuit of FIG. 2. When the "record" switch S3 of FIG. 2 is closed in conjunction with the "play" switch S4 in the master control circuit, a connection is completed across the input terminals 704 of FIG. 7 so as to energize the relay K2. The energizing of the relay causes the cue solenoids L1 and L3 to be energized to move the movable chassis 310 down to its active position, so that the pucks 304 in the duplicating equipment are simultaneously brought down against their associated capstans 306, to drive the tapes 206 in the individual cassettes 30 (FIG. 3). The energizing of the relay K2 also serves to energize the drive motors B11, B12, B13, B14 (FIGS. 5 and 7) for the various cassettes. When the relay K2 is deenergized, on the other hand, the return solenoid L2 is energized so as to return the movable chassis 310 to its upper inactive position. This releases the pucks 304 and the heads 308 from the tapes in the cassettes 30, and the cassettes may be removed.

The magnetic tape 206 in the individual cassettes is very thin, of the order of about one-quarter of a mil thick, and it cannot be accelerated too quickly or it will stretch and break. Therefore, it is important to coordinate the takeup reel 204 of the individual cassettes 30 with the drive of the capstan 306. This is important because if the capstan is turning faster than the takeup reel the tape will be caused to spill out of the cassette and become tangled. Conversely, if the takeup reel is moving quicker than the capstan, there is a danger of breaking the tapes. Therefore, the drive of the capstan and the takeup reel must be coordinated. The third element which also must be coordinated is the puck 304, since it must be brought down at the proper time in order that the tape will not be too suddenly accelerated by the capstan.

Figure 5:
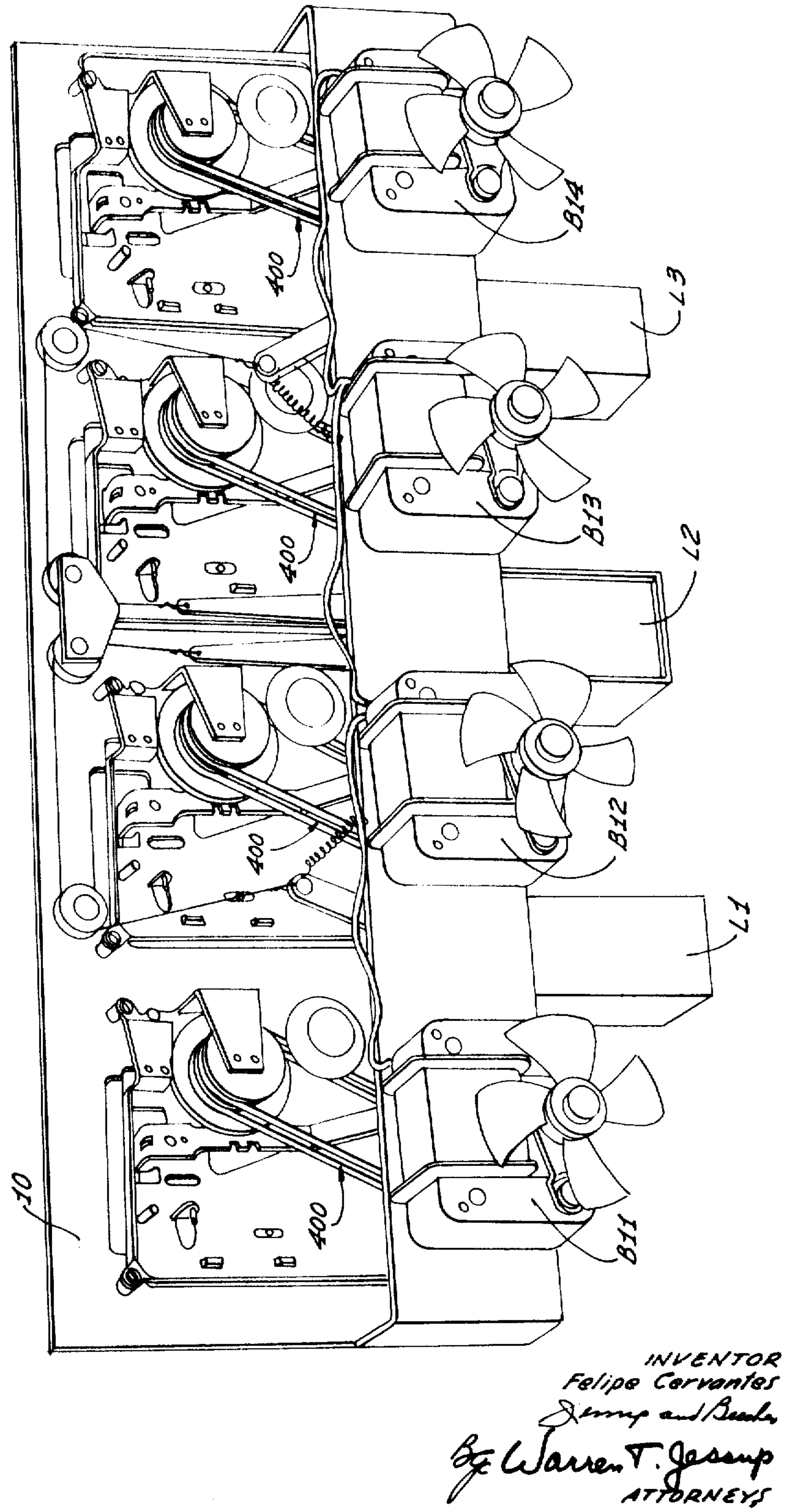

As described above, the takeup reel and capstan for each cassette is driven from a common motor B11, B12, B13 or B14, and by a drive belt arrangement 400 (FIGS. 5 and 6). Each capstan is driven by a pair of belts 400*a*, 400*b* which tightly link its corresponding motor to the drive pulley 401 of the capstan, so that the capstan always turns at a speed closely approximating the speed of the motor, in order to avoid flutter and other adverse effects on the tape. It is important that the capstan 306 for each cassette be driven at a constant even speed, since it is the element which determines the speed at which the tape will be drawn across the magnetic head. The purpose of the takeup reel 204 in the individual cassettes, on the other hand, is simply to serve as a takeup device which must be rotated at a rate necessary to maintain proper tension in the tape between it and the capstan. The takeup reel therefore is driven from a pulley 402 (FIG. 6) which, in turn, is driven by only one of the two drive belts (400*b*) is a slip clutch arrangement. The takeup reel is driven at a slightly higher speed than the capstan at all times so as to maintain the desired tension in the tape.

The puck, or pinch roller, 304 (FIG. 4) for each cassette is brought down against its corresponding capstan 306 when the cue solenoids L1 and L3 are energized upon a command from the master tape control unit to move the aforesaid movable chassis 310 down from its upper inactive position to its lower "record" position. The relay K2 is constructed to that the cue solenoids L1 and L2 are energized before the motors B1, B2, B3 and B4. This causes the corresponding pucks 304 first to be brought down against the tape 206 in each cassette 30, with the corresponding capstans 306 and takeup reels 204 being activated a short time later which, for example, is of the order of a few milliseconds.

The operation described above assures that the pucks 304 will move the tape 206 in each cassette 30 against the corresponding capstans 306 prior to the rotation of the capstans. Thereafter, the motors B1, B2, B3, B4 rapidly come up to speed and the tapes 206 in the cassettes are rapidly accelerated without danger of breakage. To assure that the pucks 304 will be rapidly and positively moved away from the capstans 306 at the end of the program, the return solenoid L2 is used rather than relying on spring tension alone, and this latter solenoid becomes energized when the cue solenoids L3 and L4 are deenergized so as to provide a positive control on the movable chassis 310 to move it to its inactive position.

I claim:

1. In a magnetic tape duplicator and which includes: a housing; means on said housing for supporting a master tape supply reel and a master tape takeup reel, a master tape electromagnetic transducer head mounted on said housing; a master tape drive capstan rotatably mounted on said housing for driving the master tape from the supply reel across the aforesaid head; and electrically energized drive motor for the capstan mounted in said housing; a pinch roller mounted in said housing and movable from an inactive position tò an operative position in which it squeezes the master tape against the aforesaid capstan; and electrically energized solenoid means for said pinch roller also mounted in said housing; a control system including: first control circuitry coupled to said capstan drive motor for causing said motor to be energized selectively so as to drive said capstan either at a relatively low selected speed or at a relatively high selected speed; and a control circuitry responsive to said first control circuitry and electrically coupled to said solenoid means to cause said solenoid means to move said pinch roller to its operative position only when said first-mentioned control circuitry has energized said drive motor to drive said capstan at said relatively low speed, the said further control circuitry including means for activating the first control circuitry to change the capstan drive motor to said relatively high speed when the pitch roller is in its operative position.

2. The control system defined in claim 1, in which said drive motor includes a low-speed winding and a high-speed winding, and in which said first control circuitry includes relay means for selectively energizing said low-speed and high-speed windings of said drive motor.

3. The control system defined in claim 2, and which includes switching means for initially causing said relay means to energize said low-speed winding of said drive motor, and for subsequently causing said second control circuitry to cause said solenoid means to move said pinch roller to its operative position and simultaneously cause said relay means to energize said high-speed winding of said drive motor.

4. The combination defined in claim 1, and which includes a movable chassis mounted in said housing; a plurality of further pinch rollers carried by said movable chassis; a corresponding plurality of further drive capstans mounted in said housing; and further solenoid means mechanically coupled to said movable chassis for causing said movable chassis to move said last-mentioned pinch rollers simultaneously from an inactive position to an operative position with respect to said last-mentioned drive capstans.

5. The combination defined in claim 4, and which includes circuit means coupled to said second control circuitry to energize said last-mentioned solenoid means upon the activation of said second control circuitry.

6. The combination defined in claim 4, and which includes a corresponding plurality of electromagnetic record heads mounted on said movable chassis and movable therewith to an operative position upon the aforesaid movement of said chassis.

7. In a magnetic tape duplicator and which includes:

a housing;

means on said housing for supporting a master tape supply reel and a master tape takeup reel;

a master tape electromagnetic transducer head mounted on said housing;

a master tape drive capstan rotatably mounted in said housing for driving the master tape from the supply reel and across said head;

a pinch roller mounted in said housing and movable from an inactive position to an operative position in which it squeezes the master tape against the aforesaid capstan; and electrically energized solenoid means for said pinch roller mounted in said housing;

the combination of:

a movable chassis mounted in said housing;

a plurality of further pinch rollers mounted on said movable chassis;

a corresponding plurality of further drive capstans mounted on said housing in spaced relationship with respective ones of said further pinch rollers; and further solenoid means mechanically coupled to said movable chassis for moving said movable chassis from a first position to a second position to being said further pinch rollers into operative relationship with respective ones of said further drive capstans.

8. The combination defined in claim 7, and which includes control circuitry for energizing said first-mentioned solenoid means to move said master tape pinch roller to its operative position, and for simultaneously energizing said further solenoid means to move said movable chassis to its second position.

9. In the magnetic tape duplicator defined in claim 7, and which includes means for supporting a plurality of cassettes on said duplicator, each cassette having a tape supply reel and a tape takeup reel, and a magnetic tape extending therebetween; said cassettes being supported by said last-named means with their respective tapes positioned between said further pinch rollers and said further drive capstans.

10. In the magnetic tape duplicator of claim 9, and which includes coordinated drive means for said further capstans and for the takeup reels of the cassettes to avoid breakage and spillage of the cassette tapes when said further pinch rollers are brought into the aforesaid operative relationship with said further drive capstans.

11. Apparatus for reproducing signals prerecorded on magnetic tape and recording the signals simultaneously on a plurality of tape-loaded cassettes comprising a tape transport for receiving the prerecorded magnetic tape, the tape transport including a playback head and means for driving the tape past the head, said drive means moving the tape at a speed past the head at least eight times faster than the normal playback speed of the tape, a plurality of cassette transports for receiving magnetic tape loaded cassettes, each cassette transport including a record head, and means for driving the tapes in the cassettes simultaneously at the same speed, said drive means moving the tapes of the cassettes past the heads at a speed at least eight times the normal recording speed of the tape, the multiple for the prerecorded tape drive speed and the cassette tape drive speed being the same, said drive means for moving the prerecorded tape and the tape in each of the cassettes including a separate motor and capstan for each tape, and means including pinch rollers engaging the tapes with the capstans for simultaneously energizing the motors and engaging the tapes with the capstans, the motors when energized accelerating the capstans and tapes up to said high speed.

12. A magnetic tape duplicator comprising a master tape transport for receiving a master tape, a drive capstan positioned to engage the master tape, means for engaging the tape with the drive capstan when activated, means including a playback head for reproducing signals for the tape, means responsive to said engaging means when activated for accelerating the drive capstan up to operating speed after the tape engages the capstan, a plurality of tape cassette drive assemblies for receiving tape-loaded cassettes, a drive capstan associated with each of said assemblies, means for simultaneously engaging the tapes in said cassettes with the drive capstans when activated, means including a recording head associated with each drive assembly for recording signals on each of the tapes in said cassettes, motor means responsive to said engaging means when activated for accelerating the drive capstan associated with each cassette drive assembly up to operating speed after the tapes engage the capstans, and means coupling the signal from said signal-reproducing means to each of said signal-recording means.

* * * * *

PO-1050
(5/69)

UNITED STATES PATENT OFFICE
CERTIFICATE OF CORRECTION

Patent No. 3,620,476 Dated November 16, 1971

Inventor(s) Felipe Cervantes

It is certified that error appears in the above-identified patent and that said Letters Patent are hereby corrected as shown below:

Column 2, Line 40 - Insert "engage" before the words "the tape";
Column 3, Line 67 - For "THe" substitute "The";
Column 4, Line 46 - Delete "in a" and substitute "switches--;
Line 59 - For "beings" substitute "begins";
Column 6, Line 28 - For "tapes" substitute "tape";
Line 49 - For "is a" substitute "in a";
Column 8, Line 11 - For "being" substitute "bring";
Line 58 - After the word "signals" substitute the word "from" for "for".

Signed and sealed this 23rd day of May 1972.

(SEAL)
Attest:

EDWARD M.FLETCHER,JR.
Attesting Officer

ROBERT GOTTSCHALK
Commissioner of Patents